UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

GRAY-BLACK TETRAZO DYE.

SPECIFICATION forming part of Letters Patent No. 493,564, dated March 14, 1893.

Application filed September 1, 1892. Serial No. 444,821. (Specimens.) Patented in France March 28, 1892, No. 220,468.

*To all whom it may concern:*

Be it known that I, JAKOB SCHMID, a citizen of Switzerland, residing at Basle, Switzerland, have invented new and useful Improvements in the Production of a Gray-Black Tetrazo Coloring-Matter or Dye-Stuff, (for which I have received Letters Patent in France, No. 220,468, dated March 28, 1892,) of which the following is a specification.

My invention relates to the production of a new gray-black tetrazo-dye the composition of which corresponds to the formula:

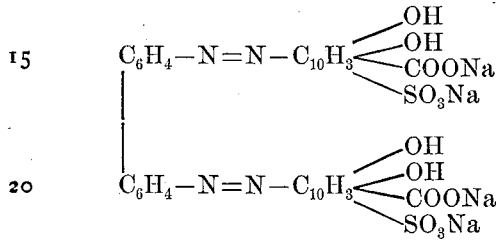

resulting from the combination of one molecular proportion of tetrazo-diphenyl with two molecular proportions of mono-sulpho-dioxy-naphthoic acid of French patent No. 219,875 dated March 4, 1892.

In carrying out my invention practically I proceed as follows: 4.6 kilos of benzidine are diazotized in the well known manner with fifteen kilos of hydrochloric acid and 3.5 kilos of sodium nitrite. The obtained diazo compound is introduced into a cooled solution of sixteen kilos of the sodium salt of mono-sulpho-dioxy-naphthoic acid and ten kilos of soda. The formation of the coloring matter begins immediately and is terminated after standing for several hours. The solution is heated, the dyestuff precipitated with common salt, pressed and dried. It forms a dark glittering crystalline powder of metallic luster and dissolves easily in water with a red-violet, in concentrated sulphuric acid with a pure blue coloration. It is insoluble in alcohol, ether and benzine.

The new coloring matter dyes cotton direct from gray to violet-black shades by the aid of sulphate of soda or common salt and soap, according to the intensity of tints. If the dark tints are treated subsequently with pyrolignite of iron, they change into black.

An analogous dyestuff is obtained by substituting in the above mentioned example for benzidine the equivalent quantity of tolidine.

I do not claim in this application for a patent the production of mono-sulpho-dioxy-naphthoic acid, which forms the subject matter of a separate application for a patent filed by myself and R. Paganini, August 25, 1892, Serial No. 444,103.

What I claim as new, and desire to secure by Letters Patent, is—

1. The process of producing a gray-black tetrazo dyestuff which consists in combining one molecular proportion of tetrazo-diphenyl or ditolyl with two molecular proportions of the sodium salt of mono-sulpho-dioxy-naphthoic acid, substantially as herein described.

2. The gray-black tetrazo dye hereinbefore described which can be obtained from tetrazo-diphenyl and the sodium salt of mono-sulpho-dioxy-naphthoic acid and which is a dark glittering crystalline powder of metallic luster, which dissolves easily in water with a red-violet, in concentrated sulphuric acid with a pure blue coloration and is insoluble in alcohol, ether and benzine.

In testimony whereof I have hereunto set my hand in the presence of two subscribing witnesses.

JAKOB SCHMID.

Witnesses:
GEORGE GIFFORD,
F. WALTER.